(12) United States Patent
Carville, Jr.

(10) Patent No.: US 6,712,026 B1
(45) Date of Patent: Mar. 30, 2004

(54) RESTRAINT-ASSISTING HANDLE, A RESTRAINT ASSEMBLY, AND A METHOD FOR RESTRAINING AN ANIMAL

(75) Inventor: Thomas P. Carville, Jr., Johnstown, NY (US)

(73) Assignee: J.T.M. Enterprises, Johnstown, NY (US)

( * ) Notice: Subject to any disclaimer, the term of this patent is extended or adjusted under 35 U.S.C. 154(b) by 0 days.

(21) Appl. No.: 10/429,466

(22) Filed: May 5, 2003

(51) Int. Cl.$^7$ .................... A01K 27/00; B65H 75/34
(52) U.S. Cl. .................... 119/796; 119/794
(58) Field of Search .................... 119/796, 797, 119/798, 792, 793, 794, 769, 772, 774

(56) References Cited

U.S. PATENT DOCUMENTS

| | | | | |
|---|---|---|---|---|
| 716,659 | A | * 12/1902 | Bjurland | 119/772 |
| 2,314,504 | A | 3/1943 | Lifchultz | 242/98 |
| 3,332,398 | A | 7/1967 | Mintz | 119/109 |
| 4,892,063 | A | 1/1990 | Garrigan | 119/109 |
| 5,038,719 | A | 8/1991 | McDonough | 119/110 |
| 5,363,810 | A | 11/1994 | Kraus | 119/795 |
| 5,483,926 | A | 1/1996 | Bogdahn | 119/796 |
| D388,558 | S | 12/1997 | Miller | 119/795 |
| D392,429 | S | 3/1998 | Plewa et al. | D30/153 |
| 5,732,661 | A | 3/1998 | Lagro | 119/795 |
| 5,762,029 | A | * 6/1998 | DuBois et al. | 119/796 |
| 5,890,456 | A | * 4/1999 | Tancrede | 119/794 |
| 6,024,054 | A | * 2/2000 | Matt et al. | 119/796 |
| 6,148,773 | A | 11/2000 | Bogdahn | 119/796 |
| D439,302 | S | 3/2001 | Plewa | D23/153 |
| 6,223,694 | B1 | 5/2001 | Rubin | 119/796 |
| 6,237,539 | B1 | 5/2001 | Sporn | 119/795 |
| 6,308,662 | B1 | 10/2001 | Furman | 119/776 |
| D454,670 | S | 3/2002 | Weller | D30/153 |
| D460,586 | S | 7/2002 | Holt, Jr. et al. | D30/153 |
| 6,453,851 | B1 | 9/2002 | Holt, Jr. et al. | 119/795 |
| 2002/0035968 | A1 * | 3/2002 | Prusia et al. | 119/792 |
| 2003/0145804 | A1 * | 8/2003 | Vaccari | 119/796 |

FOREIGN PATENT DOCUMENTS

DE    0 941 657 A2    9/1999    .......... A01K/27/00

* cited by examiner

Primary Examiner—Charles T. Jordan
Assistant Examiner—Judith A. Nelson
(74) Attorney, Agent, or Firm—Heslin Rothenberg Farley & Mesiti P.C.; John Pietrangelo

(57) ABSTRACT

A restraint-assisting handle, an animal restraint assembly, and a method of restraining an animal are disclosed. The handle, assembly, and method facilitate the handling of wild and domestic animals by means of leashes. The handle, assembly, and method are amenable for use with retractable leashes, though other types of leashes may be used. Aspects of the present invention can minimize the potential for animal handlers, for example, pet owners, to be injured when using a retractable leash. One aspect of the invention is a restraint-assisting handle for use with a retractable leash having an elongated cord and a housing for storing the elongated cord. The restraint-assisting handle includes an elongated element having a channel through which the cord freely passes as the cord extends from and retracts to the housing of the retractable leash.

18 Claims, 8 Drawing Sheets

RESTRAINT-ASSISTING HANDLE, A RESTRAINT ASSEMBLY, AND A METHOD FOR RESTRAINING AN ANIMAL

FIELD OF THE INVENTION

This invention relates, generally, to a restraining device for a pet leash, more particular, to a restraining device for use with a retractable pet leash that allows the user to manually control a pet without injury.

BACKGROUND OF THE INVENTION

Pet owners commonly restrain their pets using leashes. For example, the typical leash includes an elongated strap or cord having a loop or handle for grasping by the pet owner and a clasp that attaches the leash to the pet's collar. One common type of leash is the retractable leash having a handle consisting of a housing having a spring-driven mechanism that draws the leash, for example, a braided nylon cord, into the housing for shortening the leash cord and for storing the leash cord when the leash is not in use. Such leashes, for example, as disclosed in utility U.S. Pat. No. 2,324,504 and design U.S. Pat. No. 392,429, can provide effective means of restraining a pet during simple "walks" or during training.

However, even when a pet is restrained by a pet owner using a leash, an unruly or an excited pet can often be difficult for a pet owner to handle. Even moderately sized excited pets can be difficult to control with a conventional leash having a single loop or handle by which the pet owner can grasp the leash. For this reason, many multi-handle leashes have been developed, for example, those disclosed in utility U.S. Pat. Nos. 3,332,398; 5,363,810; 5,732,661; and 6,223,694 B1 and in design patents Des. U.S. Pat. Nos. 388,558 and D454,670 S. However, these multi-handle designs do not address the problem of handling an unruly pet restrained by a retractable leash. Utility U.S. Pat. No. 6,453,851 B1 and design U.S. Pat. No. D460,582 S disclose a gripping device for a strap-type leash that can be useful in restraining a pet. However, this gripping device cannot be used for a cord-type leash, nor is this gripping device applicable to a retractable leash.

In addition, a leash of any kind attached to an excited or frighten animal can cause injury to the pet owner, to the pet, or even to a person unwittingly standing nearby. The rapid movement of a leash attached to an excited animal can cause cuts, scrapes, burns, lacerations, and even amputations. Though the potential for injury is present for all types of leashes, the potential for injury can become even more acute when the leash comprises a thin cord-type leash, for example, the kind typically used in retractable leashes. In extreme cases, a cord-type leash attached to an excited pet can be very dangerous. In fact, there are documented cases where cord-type leashes have severed the fingers of the pet owner when their pet bolted toward another pet, a wild animal, or a person familiar to the pet.

Aspects of the present invention overcome these and other disadvantages of the prior art means of restraining animals.

SUMMARY OF ASPECTS OF THE INVENTION

One aspect of the present invention is a restraint-assisting handle for a retractable leash, the retractable leash having an elongated cord and a housing for storing the elongated cord, the restraint-assisting handle including an elongated element having a first end, a second end, and means for engaging the elongated cord as the elongated cord extends from and retracts to the housing of the retractable leash. In one aspect of the invention, the elongated element may further comprise an elongated channel, for example, an internal channel, extending from the first end to the second end. The elongated element may further comprise means for attaching the elongated element to the housing of the retractable leash.

Another aspect of the invention is an animal restraint assembly including: a retractable leash having an elongated cord and a housing for storing the elongated cord; and an elongated element having means for engaging the elongated cord as the elongated cord extends from and retracts into the housing of the retractable leash. In one aspect of the invention, the elongated element may further comprise an elongated channel extending from the first end to the second end. In one aspect of the invention, the means for engaging the elongated cord comprises means for slidably engaging the elongated cord. In another aspect of the invention, the elongated element may further comprise means for attaching the elongated element to the housing of the retractable leash.

Another aspect of the invention is a method of restraining an animal, the method including: providing a retractable leash having an elongated cord, a housing for storing the elongated cord, and a handle; the elongated cord having a first end comprising a means for attaching the elongated cord to the animal and a second end attached to the retractable leash; mounting an elongated element to the elongated cord; attaching the first end of the elongated cord to the animal; and restraining the animal by grasping the handle of the retractable leash in one hand and the elongated element in the other hand.

Thus, aspects of the present invention provide improved devices and methods for restraining animals, for example, pets. Aspects of the present invention minimize the potential for injuring the pet owner or animal handler by providing restraint-assisting handles that permit the user to restrain the animal with two hands. Though aspects of the present invention are amenable to use with any type of leash, certain aspects of the present invention are especially useful for retractable leashes.

BRIEF DESCRIPTION OF THE FIGURES

The subject matter that is regarded as the invention is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF FIGURES

Figure 1:
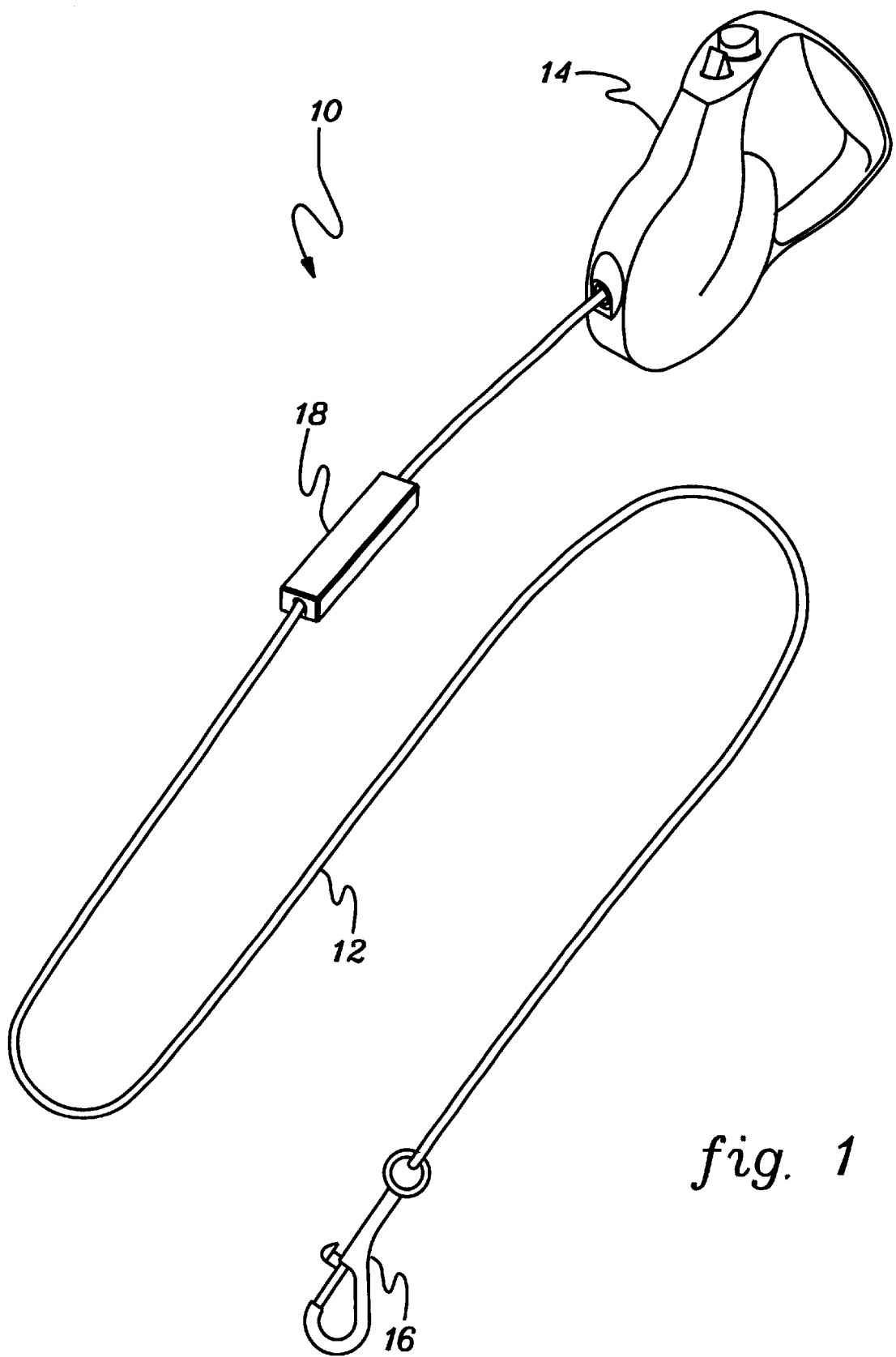
FIG. 1 is a perspective view of an animal leash according to one aspect of the present invention.

The details and scope of aspects of the present invention can best be understood upon review of the attached figures and their following descriptions. FIG. 1 illustrates a perspective view of one aspect of the present invention comprising a leash 10 having an elongated cord 12, a handle assembly 14, means 16 for attaching leash 10 to an animal, and one or more elongated elements 18, for example, one or more handles. Cord 12 may typically be a nylon cord, for example, a braided nylon cord, but cord 12 may be made from any equivalent or appropriate material, for instance, a natural material, such as cotton, sisal, jute and hemp, or synthetic material, such as polypropylene or polyester, or their equivalents. For example, when restraining larger animals, cord 12 may be a braided steel cable. Cord 12 may also be a lead or strap, for example, a nylon strap, or a strap made of one or more of the materials identified above. Though the term "cord" will be used throughout this description and in the claims, it should be understood that in the context of the present invention this term may be used interchangeably with the term "strap" or "lead".

Handle assembly 14 may comprise any appropriate structure that can be grasped by the user. For example, handle assembly 14 may simply be a free end of cord 12, a loop of material made from cord 12, or a handle or loop mounted to cord 12. In one aspect of the invention, as illustrated in FIG. 1, handle assembly 14 may comprise a housing having a retractable leash mechanism. For example, in one aspect of the invention, handle assembly 14 may comprise one of the retractable leash handle assemblies disclosed in utility U.S. Pat. Nos. 2,314,504; 5,483,926; 6,148, 773, or their equivalents; or in U.S. Pat. Nos. Des. 392,429; D439,302 S; or their equivalents.

The means 16 for attaching leash 10 to an animal may be any conventional means for attaching leash 10 to an animal, for example, a clasp, a hook, or a clip, among others. Means 16 typically attaches to the animal's collar, for example, for a dog, but may be attached to any type of device attached to the animal or to the animal itself. For example, means 16 may be attached to a harness or any similar device, for example, for restraining a horse.

According to aspects of the present invention, leash 10 includes at least one elongated element 18 mounted to cord 12. In FIG. 1, element 18 is generally illustrated as an elongated parallelepiped, but as will evident from the following discussion, element 18 may comprise many different structures while providing the desired function. According to one aspect of the invention, element 18 is mounted on cord 12, but is free to move, for example, translate or slide, along cord 12, for instance, freely slide along cord 12. Element 18 may also include means for limiting the movement of element 18 along cord 12, for example, means for fixing the position of element 18 as desired on cord 12. Aspects of the present invention having means for limiting the movement of element 18 along cord 12 will be disclosed below.

According to aspects of the present invention, element 18 provides a means for assisting the user of leash 10, for example, a pet owner, in restraining an animal. According to one aspect of the invention, element 18 provides a handle for grasping leash 10, for example, while leash 10 is also held by handle assembly 14. According to another aspect of the invention, handle assembly 14 comprises a retractable leash assembly, and element 18 comprises a handle which can translate or slide along the cord 12 as the cord of the retractable leash assembly extends from or retracts to the retractable leash assembly. In one aspect of the invention, element 18 may freely slide along cord 12. As will be discussed further below, according to one aspect of the invention element 18 may also include means for attaching element 18 to the housing of a retractable leash assembly.

Figure 2:
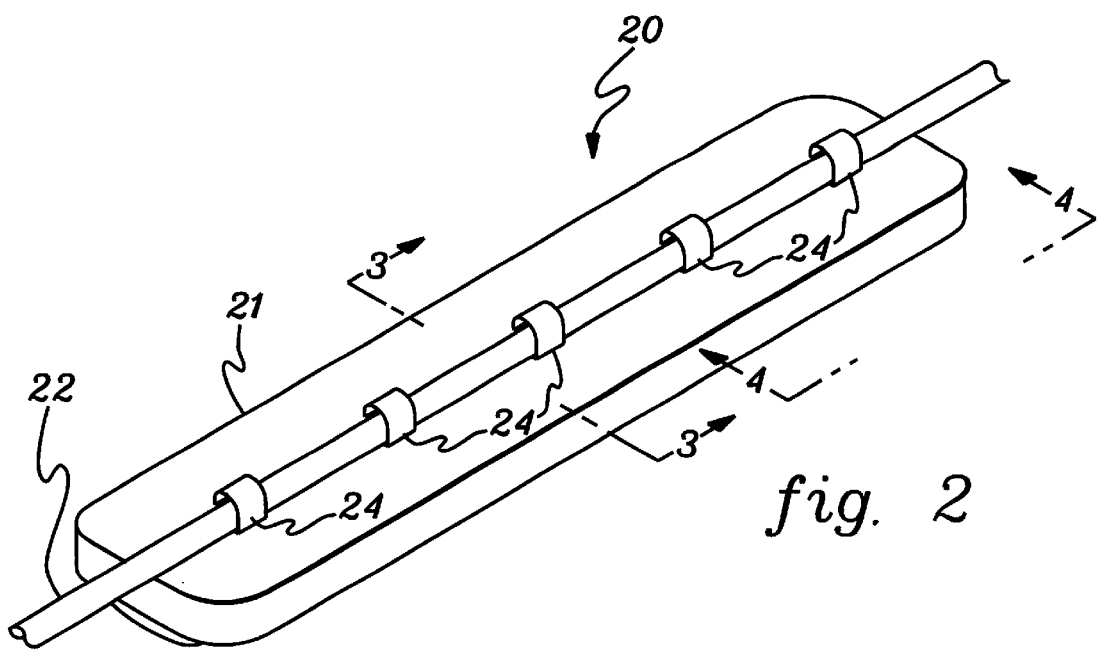
FIG. 2 is a perspective view of one aspect of the present invention.
Figure 3:
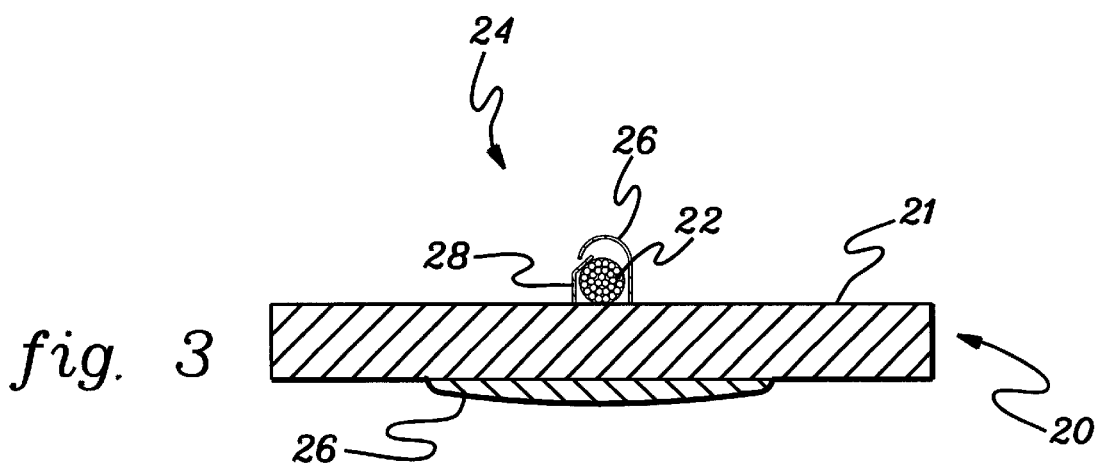
FIG. 3 is a cross-sectional view of the aspect of the invention shown in FIG. 2 as viewed along lines 3—3.
Figure 4:
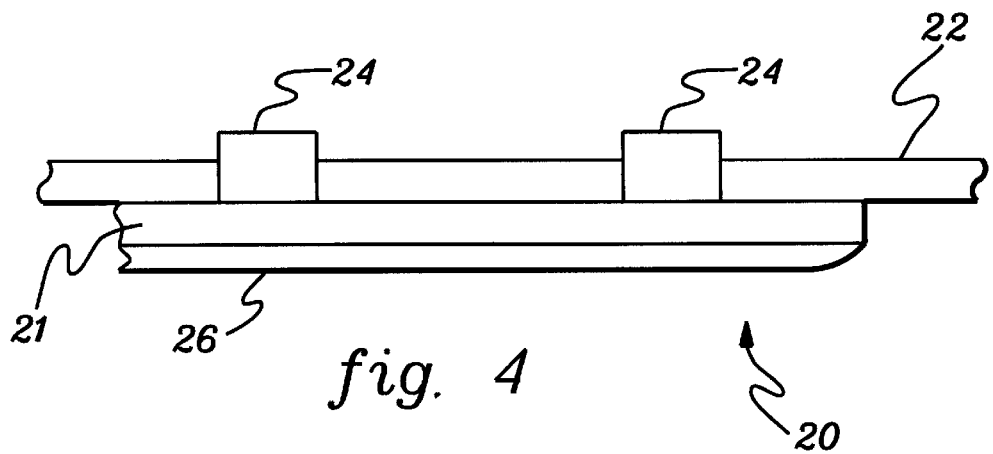
FIG. 4 is a partial elevation view of the aspect of the invention shown in FIG. 2 as viewed along lines 4—4.

FIGS. 2, 3, and 4 illustrate one element 20 that may be used for elongated element 18 shown in FIG. 1. FIG. 2 is a perspective view of an element 20 according to one aspect of the present invention. FIG. 3 is a cross-sectional view of element 20 shown in FIG. 2 as viewed along lines 3—3. FIG. 4 is a partial elevation view of element 20 shown in FIG. 2 as viewed along lines 4—4.

Element 20 may be mounted on a cord 22, which may be similar to cord 12 shown in FIG. 1. According to this aspect of the invention, element 20 includes a backing plate 21 and cord 22 is mounted to backing plate 21 by means of at least one eyelet 24. According to one aspect of the invention, element 20 includes a plurality of eyelets 24, that is, two or more eyelets 24. Eyelets 24 retain cord 22 on backing plate 21, for example, slidably retain cord 22 on backing plate 21, though eyelets 24 may fix backing plate 21 to cord 22, for example, temporarily fix backing plate 21 to cord 22. In one aspect of the invention, eyelets 24 comprise through holes that completely encircle cord 22, for example, whereby cord 22 may be threaded through eyelets 24. In another aspect of the invention, eyelets 24 may comprise structures that allow cord 22 to releasably engage eyelets 24, for example, without having to thread cord 22 through eyelets 24. For example, as shown most clearly in FIG. 3, eyelets 24 may comprise individual hooks 26 and retaining tabs 28, for example, individual hooks 26 and flexible retaining tabs 28, which permit a user to engage and disengage cord 22 from backing plate 21.

Eyelets 24 may be metallic, for example, made from steel, stainless steel, or aluminum, among other metals, or non-metallic, for example, eyelets 24 may be made from wood or plastic, for example, polypropylene, polyethylene, ABS, nylon, or their equivalents. Eyelets 24 may be attached to backing plate 21 by conventional means, for example, by mechanical fasteners, adhesives, or welding.

According to one aspect of the invention, backing plate 21 may also be made from metallic or non-metallic materials, for example, the same metallic or non-metallic materials from which eyelets 24 are made, for instance, polypropylene, polyethylene, ABS, nylon, polystyrene, polyvinyl chloride, polycarbonate, or their equivalents. In one aspect of the invention, backing plate 21 may be made from the same material as eyelets 24. In another aspect of the invention, backing plate 21 may be made from a different material than eyelets 24. In one aspect of the invention, eyelets 24 may be molded into backing plate 21 or machined into backing plate 21 whereby eyelets 24 are integral with backing plate 21.

In another aspect of the invention, backing plate 21 may include a resilient pad 26 for providing a resilient surface to facilitate grasping of element 20. For example, resilient pad 26 may comprise a plastic, for example, a vinyl, a nylon, or their equivalent; or a rubber, for example, natural rubber, EPDM, or their equivalent; or a leather or leather-like material.

Figure 5:
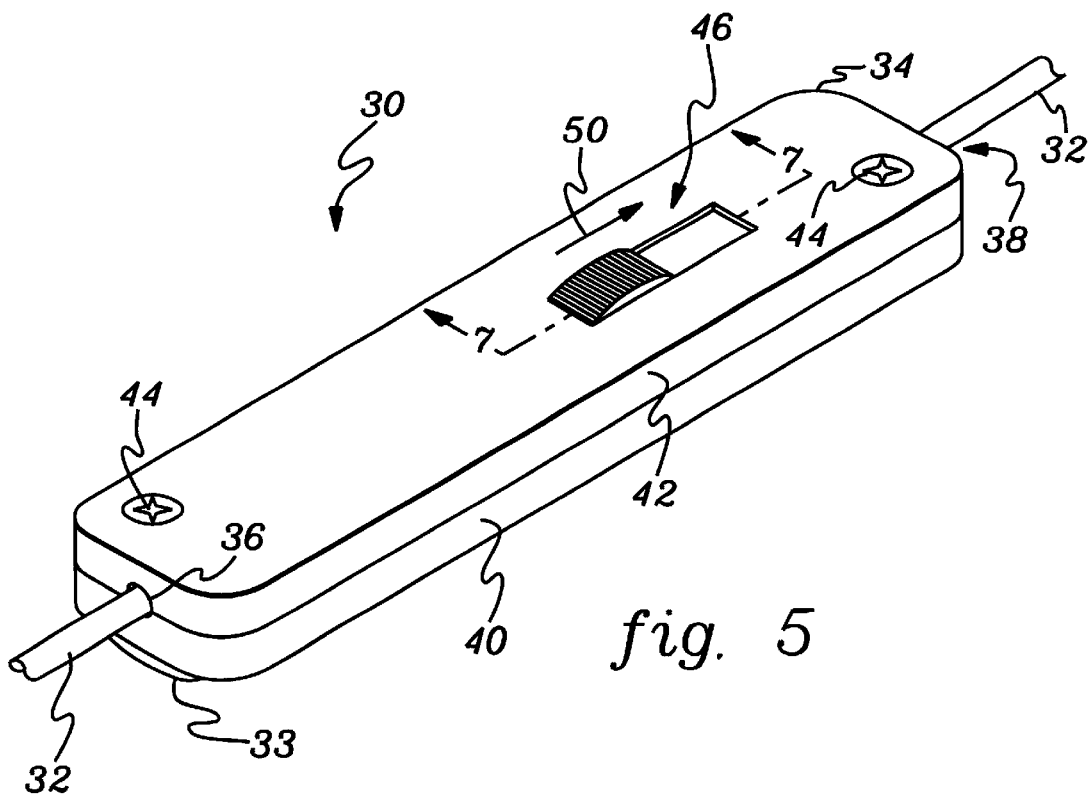
FIG. 5 is a perspective view of another aspect of the present invention.
Figure 6:
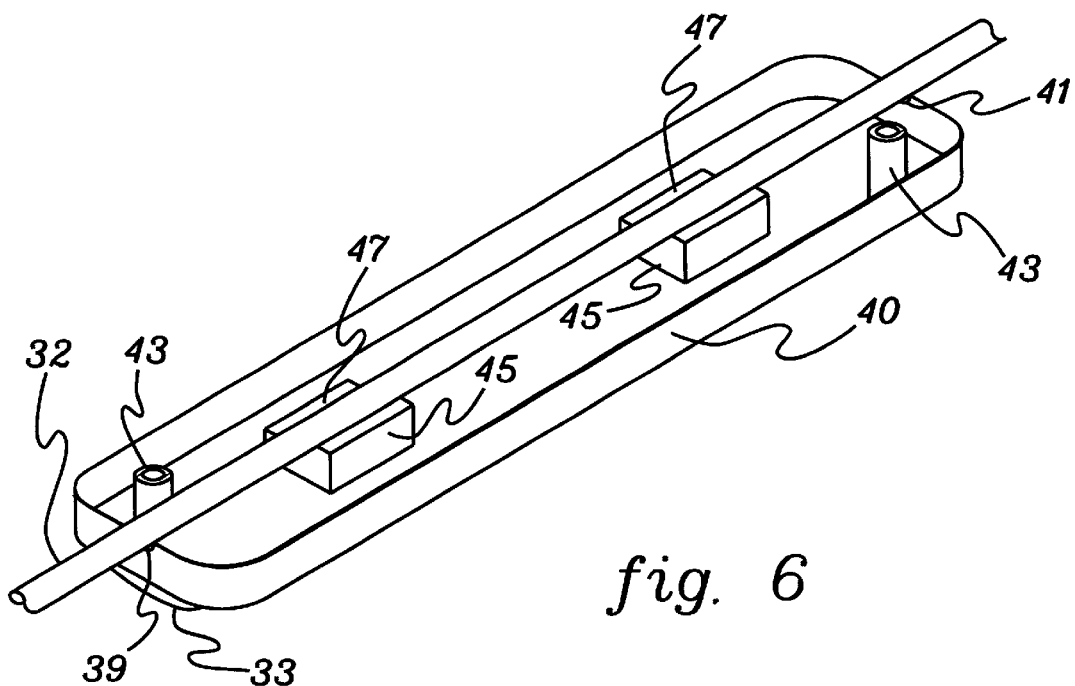
FIG. 6 is a perspective view of a lower housing of the aspect of the present invention shown in FIG. 5.

FIGS. 5 and 6 are perspective views of another aspect of the invention. FIG. 5 is a perspective view of a handle assembly 30 that can be used for elongated element 18 shown in FIG. 1. Handle assembly 30 is mounted to cord 32, for example, slidably mounted to cord 32. Cord 32 may be similar to cord 12 shown in FIG. 1.

Handle assembly 30 comprises an elongated housing 34 having a first aperture 36 and a second aperture 38 through which cord 32 passes, for example, freely passes. Though housing 34 may comprise a single integral structure, in one aspect of the invention, housing 34 may comprise at least two subassemblies, for example, a lower housing 40 and an upper housing 42. The subassemblies may be assembled together by conventional means, including welding or brazing, interlocking members, for example, to provide a "snap fit", adhesives, mechanical fasteners, or combinations thereof. In the aspect of the invention shown in FIG. 5, lower housing 40 is assembled to upper housing 42 by means of screws 44. Though 2 screws 44 are shown in FIG. 5, the housings 40, 42 may be assembled by 1 or more screws 44. Handle assembly 30 may also include a resilient pad 33 similar to pad 26 shown in FIGS. 2 through 4.

FIG. 6 is a perspective view of handle assembly 30 having upper housing 42 removed to show the internal structures of lower housing 40 according to one aspect of the invention. As shown in FIG. 6, lower housing 40 may be an essentially hollow, elongated parallelepiped with rounded ends. Though not shown, upper housing 42 may assume the same physical appearance and dimensions as lower housing 40 shown in FIG. 6 to, among other things, facilitate fabrication and assembly of handle assembly 30. Lower housing 40 and upper housing 42 typically include at least one, typically, at least two, bosses 43 having threaded holes for engaging mechanical fasteners, such as screws 44 (see FIG. 5). Lower housing 40 and upper housing 42 may have at least one depression 39, 41 at each end of housing 40 to provide half of apertures 36, 38 (see FIG. 5) through which cord 32 passes. According to one aspect of the invention, apertures 36, 38 may be provided by at least one aperture in the ends of lower housing 40 or upper housing 42, though providing depressions 39, 41 to define half of apertures 36, 38 facilitates the fabrication of handle assembly 30 by allowing lower housing 40 and upper housing 42 to be as close in physical dimension and construction as possible.

According to one aspect of the invention, lower housing 40 includes at least one projection 45 against which cord 32 can bear as cord 32 passes through handle assembly 30. Projection 45 provides at least one surface 47 that provides at least some frictional resistance to the translation of handle assembly 30 along cord 32. Though projections 45 are only illustrated in lower housing 40 in FIG. 6, upper housing 42 may also include one or more projections 45. Though projections 45 in FIG. 6 are shown as blocks, projections 45 may comprise any construction that introduces at least some friction when handle assembly 30 is translated along cord 32. Projections 45 may include vertical or horizontal plates, bars, or bosses; spherical objects; particulate material; among others. Projections 45 may be fixed to lower housing 40 and upper housing 42 or may be free to move within lower housing 40 and upper housing 42.

Housings 40, 42 and projections 45 may comprise one or more of the metallic or non-metallic materials from which backing plate 21 (see FIG. 2) may be made. In one aspect of the invention, projections 45 are made from a resilient material, for example, a rubber, polymer, or natural material, such as leather. In one aspect of the invention, projections 45 are made from the same or similar material as lower housing 40 and upper housing 42 are made. In one aspect of the invention, projections 45 and housings 40 and 42 are made from the same material, for example, from the same moldable, stampable, forgeable, or castable material, such as polyethylene, polypropylene, nylon, ABS, or their equivalents, whereby housings 40 and 42 and projections 45 can be molded, stamped, forged, cast, or otherwise fabricated as integral pieces.

Figure 7:
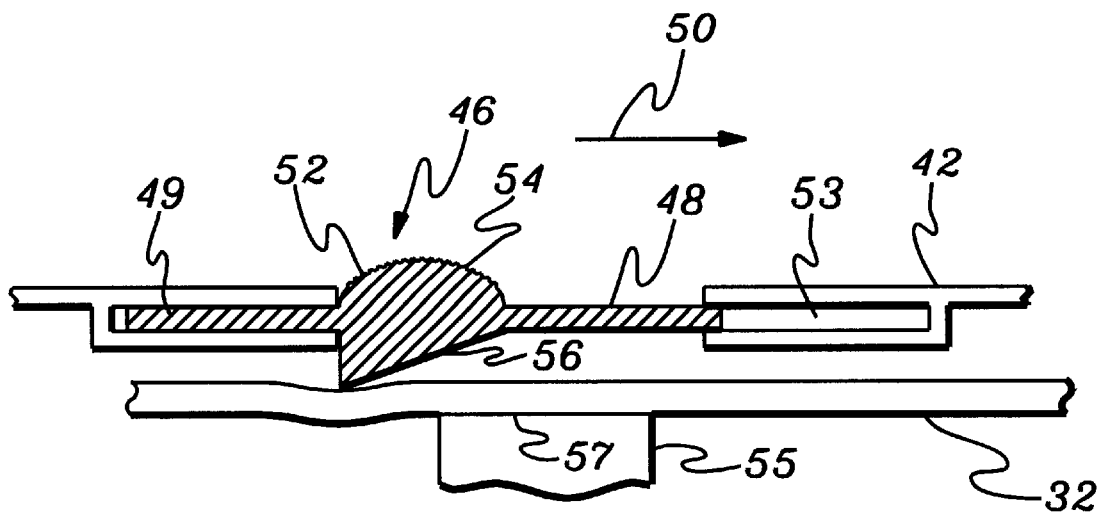
FIGS. 7 and 8 are cross-sectional views of the cord engaging mechanism shown in FIG. 5 as viewed along lines 7—7.
Figure 8:
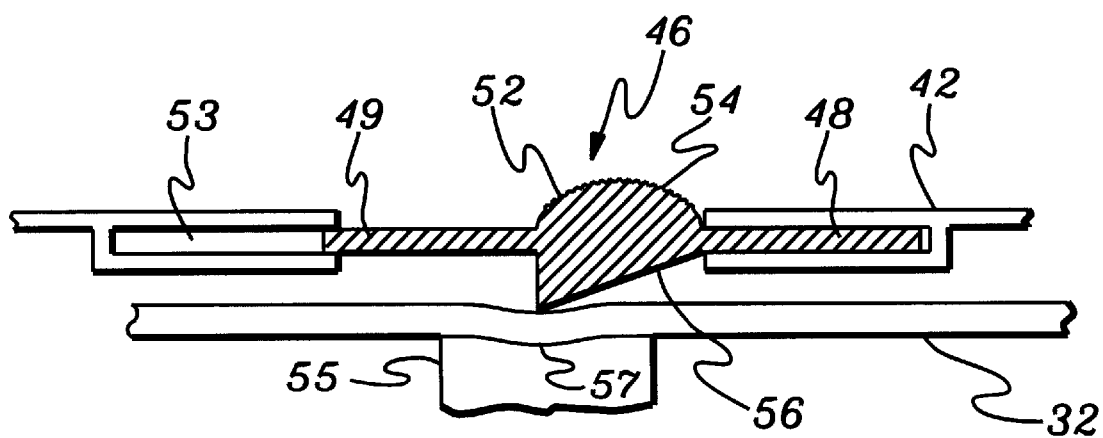

Handle assembly 30 may also include a means 46 for engaging cord 32, for example, means 46 may engage cord 32 whereby cord 32 is limited or prevented from sliding through handle assembly 30. In one aspect of the invention means 46 may be omitted. Means 46 may be used to more effectively manually restrain an animal using the present invention. Means 46 may include a slider 48 which when translated in the direction of arrow 50 (see FIG. 5) engages cord 32 whereby hand assembly 30 is limited or prevented from sliding on cord 32. Means 46 may be manually operated, for example, by a user pressing a thumb against slider 48. A cross section of one means 46 for engaging cord 32 is shown in FIGS. 7 and 8.

Figure 5A:
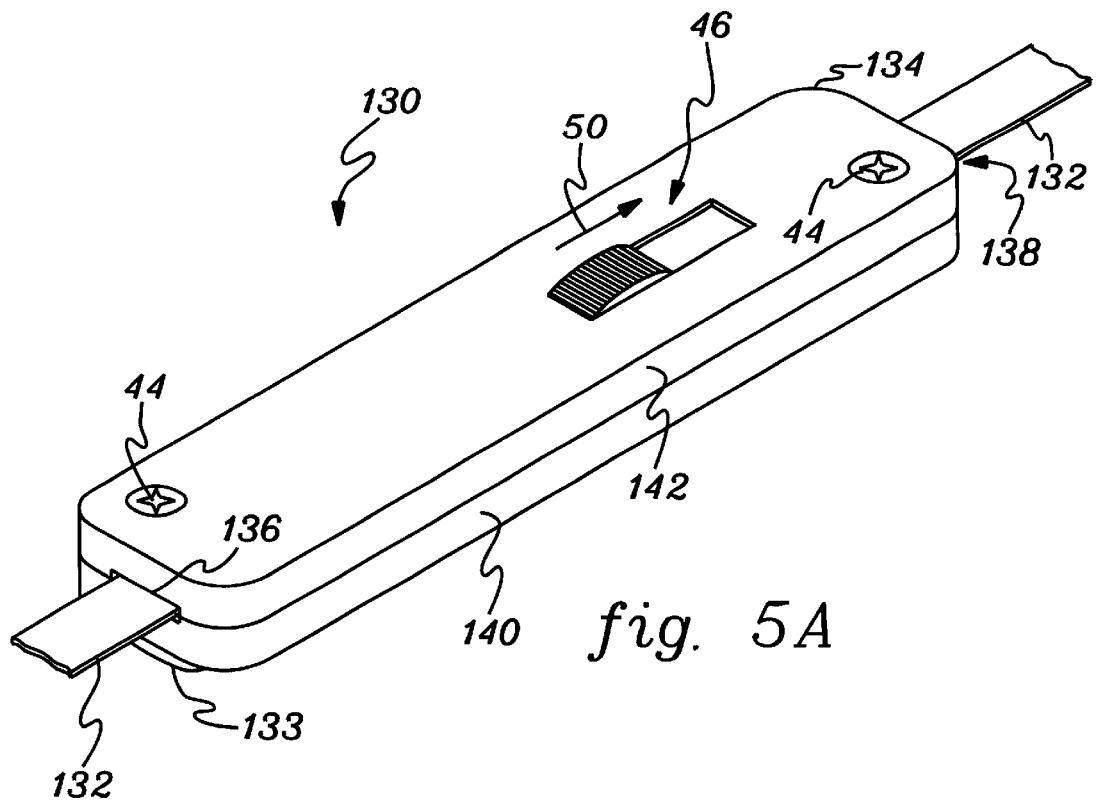
FIG. 5A is a perspective similar to FIG. 5 illustrating another aspect of the present invention for use with strap-type leash.
Figure 6A:
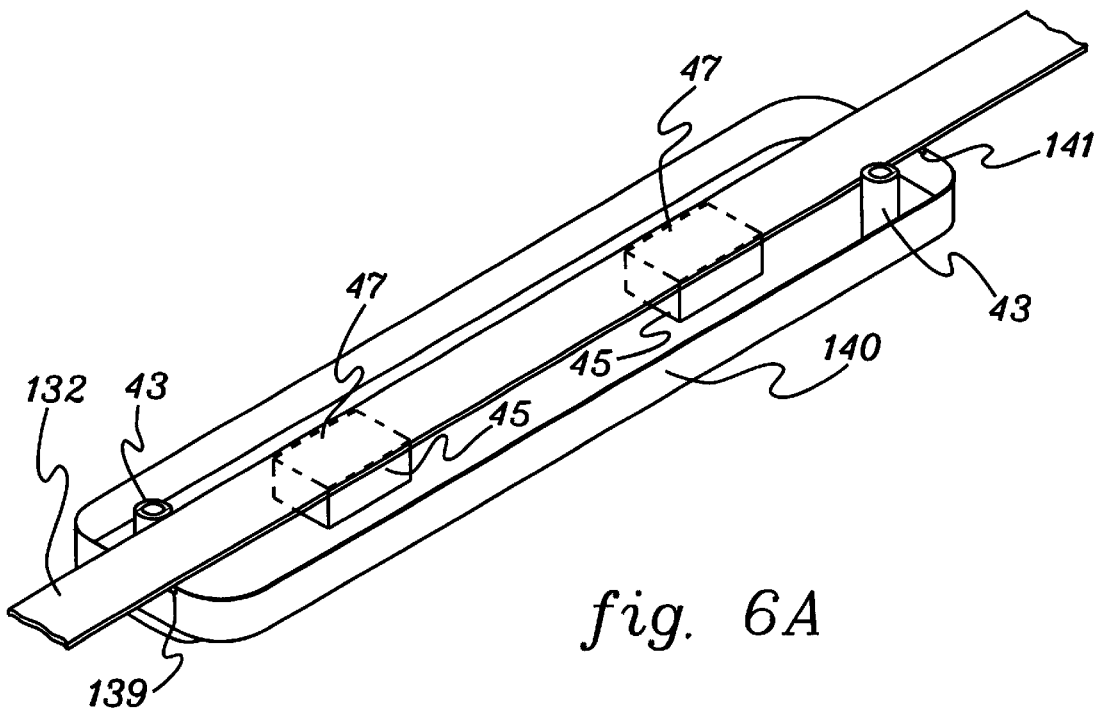
FIG. 6A is a perspective of the lower housing of the aspect of the present invention shown in FIG. 5A.

FIGS. 5A and 6A illustrate perspective views of another aspect of the invention. FIG. 5A is a perspective view of another handle assembly 130 that can be used for elongated element 18 shown in FIG. 1. Handle assembly 130 is mounted to strap 132, for example, slidably mounted to strap 132.

Handle assembly 130 is similar to and includes many of the features of handle assembly 30 shown in FIGS. 5 and 6, and these features are identified with the same reference numbers as in FIGS. 5 and 6. Handle assembly 130 comprises an elongated housing 134 having a first aperture 136 and a second aperture 138 through which strap 132 passes, for example, freely passes. Though housing 134 may comprise a single integral structure, in one aspect of the invention, housing 134 may comprise at least two subassemblies, for example, a lower housing 140 and an upper housing 142. The subassemblies may be assembled together by conventional means, including welding or brazing, interlocking members, for example, to provide a "snap fit", adhesives, mechanical fasteners, or combinations thereof. In the aspect of the invention shown in FIGURE 5A, lower housing 140 is assembled to upper housing 142 by means of screws 44. Handle assembly 130 may also include a resilient pad 133 similar to pad 26 shown in FIGS. 2 through 4.

FIG. 6A is a perspective view of handle assembly 130 having upper housing 142 removed to show the internal structures of lower housing 140 according to one aspect of the invention. Lower housing 140 and upper housing 142 typically include at least one, typically, at least two, bosses 43 having threaded holes for engaging mechanical fasteners, such as screws 44 (see FIG. 5A). Lower housing 140 and upper housing 142 may have at least one depression 139, 141 at each end of housing 140 to provide half of apertures 136, 138 (see FIG. 5A) through which strap 132 passes. According to one aspect of the invention, apertures 136, 138 may be provided by at least one aperture in the ends of lower housing 140 or upper housing 142, though providing depressions 139, 141 to define half of apertures 136, 138 facilitates the fabrication of handle assembly 130 by allowing lower housing 140 and upper housing 142 to be as close in physical dimension and construction as possible. Similar to handle assembly 30 shown in FIGS. 5 and 6, handle assembly 130 may include at least one projection 45 against which strap 132 can bear as strap 132 passes through handle assembly 130. Handle 130 may also include a means 46 for engaging strap 132, for example, similar to the means illustrated in FIGS. 7 and 8.

Figure 6B:
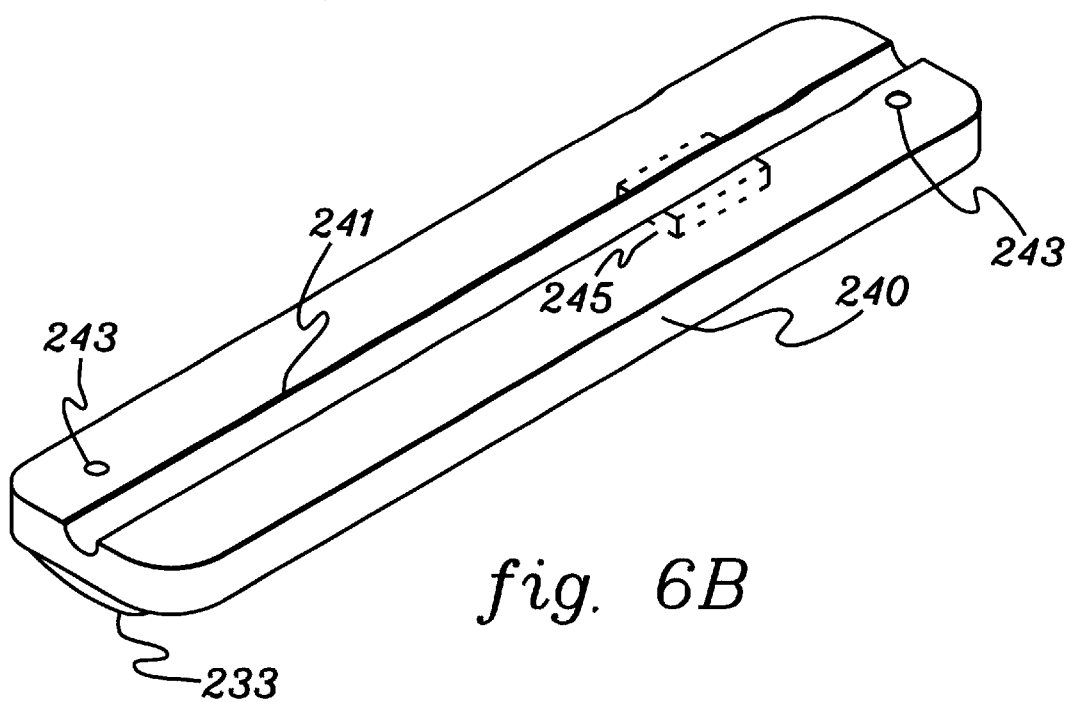
FIG. 6B is a perspective view of another lower housing of the aspect of the present invention shown in FIG. 5.
Figure 6C:
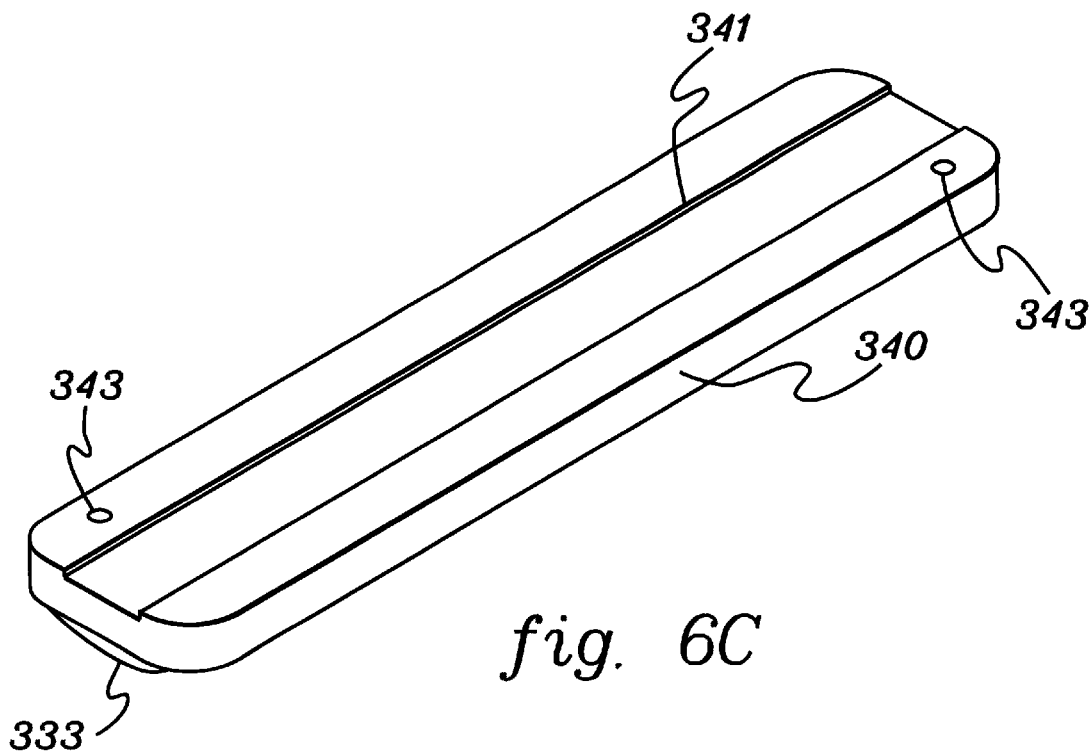
FIG. 6C is a perspective view of another lower housing of the aspect of the present invention shown in FIG. 5A.

FIGS. 6B and 6C are perspective views of alternative lower housings 240 and 340 according to another aspect of the invention. Lower housing 240 may be used for handle assembly 30 and cord 32 shown in FIG. 5. FIG. 6B illustrates another aspect of handle 30 from FIG. 5 having upper housing 42 removed to show the internal structure of lower housings 240. Lower housing 340 in FIG. 6C may be used for another aspect of handle assembly 130 and strap 132 shown in FIG. 5A. FIG. 6C illustrates another aspect of handle 130 from FIG. 5A having upper housing 142 removed to show the internal structure of lower housing 340. According to these aspects of the invention, lower housings 240 and 340 include longitudinal channels 241, 341, respectively, through which cord 32 or strap 132 pass. Corresponding upper housings 42 and 142 may have complementary channels or comprise flat surfaces that enclose channels 241, 341. Similar to lower channels 40 and 140, lower channels 240 and 340 may be assembled by means of threaded fasteners, for example, by means of threaded holes 243, 333, respectively, and may include cushioned pads 233, 333, respectively.

As shown in phantom in FIG. 6B, lower housing 240 may include a cavity 245 positioned along channel 241, for example, straddling channel 241. Cavity 245 may be used to accommodate the deflection of cord 32, for example, the lateral deflection of cord 32, when cord 32 is impinged by means 46, for example, as shown in FIGS. 7 and 8.

FIG. 7 is a cross sectional view of means 46 shown in FIG. 6 as viewed along lines 7—7 in FIG. 6. As shown in FIG. 7, means 46 includes a slider 48 mounted for translation in upper housing 42. Slider 48 may include a plate 49 that slidably mounts in a cavity 53 in upper housing 42. In the aspect of the invention shown in FIG. 7, slider 48 includes a button 52 that provides a surface upon which the user can push to translate slider 48. Button 52 may include serrations 54 to enhance engagement of the button 52 by the user. Slider 48 may also includes at least one surface 56, for example, an inclined surface, which can bear against cord 32 to limit or prevent handle assembly 30 from translating on cord 32. In one aspect of the invention surface 56 is not inclined, for example, surface 56 may be substantially horizontal as viewed in FIGS. 7 and 8. According to one aspect of the invention, means 46 may also include at least one projection 55, similar to projection 45 shown in FIG. 6, which may provide surface 57 which cooperates with surface 56 to impinge cord 32 and limit or prevent handle 30 from translating on cord 32.

FIG. 8 is a cross sectional view similar to the view shown in FIG. 7 but illustrating the activation of means 46 when slider 48 is translated in the direction of arrow 50, shown in FIG. 7. As shown in FIG. 8, according to one aspect of the invention, when slider 48 is translated in the direction of arrow 50, at least a portion of surface 56 of slider 48 impinges cord 32 and compresses cord 32 between surface 56 and surface 57 on projection 55. Again, surface 57 may take any form as shown and described with respect to projections 45 in FIG. 6.

Figure 9:
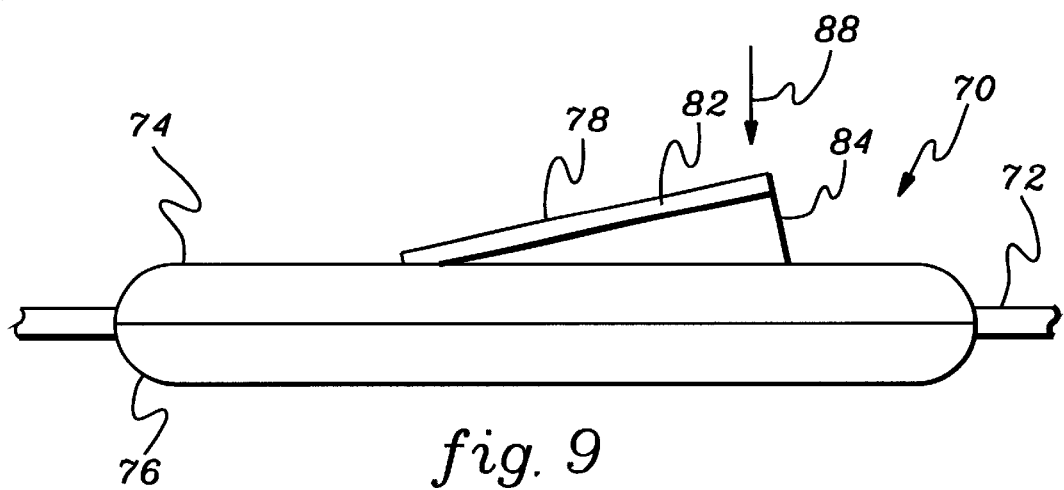
FIG. 9 is an elevation view of another aspect of the present invention.
Figure 10:
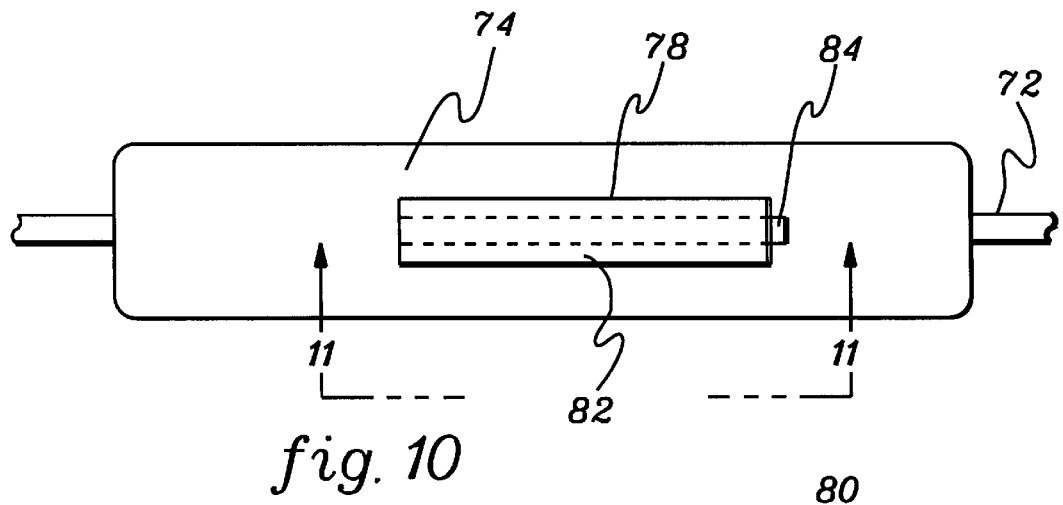
FIG. 10 is a top view of the aspect of the invention shown in FIG. 9.
Figure 11:
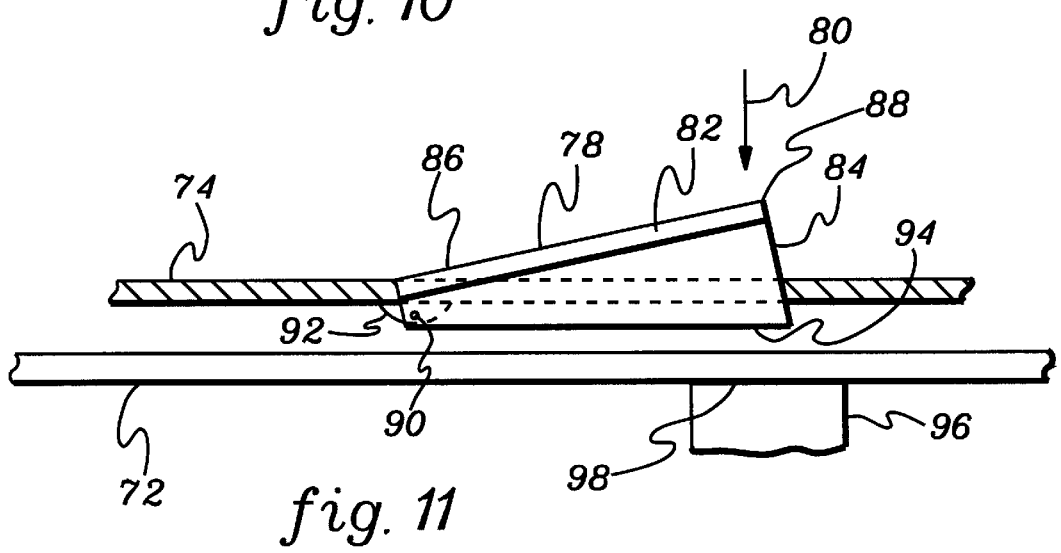
FIG. 11 is a cross-sectional view of the cord engaging mechanism shown in FIG. 10 as viewed along lines 11—11.

FIGS. 9, 10, and 11 illustrate another aspect of the present invention having another means for engaging a cord for a handle assembly according to another aspect of the invention. FIG. 9 is a side elevation view of a handle assembly 70 mounted on a cord 72, which may be similar to cord 12 of FIG. 1. FIG. 10 is a top view of handle assembly 70 shown in FIG. 9. In the aspect of the invention shown in FIGS. 9, 10, and 11, handle assembly 70 comprises an upper housing 74 and a lower housing 76. Housings 74 and 76 may be similar to housings 40, 42 shown in FIGS. 5 and 6. According to this aspect of the invention, upper housing 74 includes a pivotably-mounted bar 78 that penetrates upper housing 74 that, when pivotally-deflected in the direction shown by arrow 80, impinges cord 72 to limit or prevent handle assembly 70 from translating along cord 72. In the aspect of the invention shown in FIGS. 9 and 10, bar 78 comprises a flange section 82 and a web section 84, though bar 78 may take many appropriate cross-sectional shapes.

FIG. 11 is a cross-sectional view of handle assembly 70 illustrating the mounting and operation of bar 78. As shown in FIG. 11, in this aspect of the invention, bar 78 is pivotally mounted at a first end 86 to upper housing 74 and is free at a second end 88. First end 86 may be pivotally mounted by means of a pin 90 supported by mounting boss 92 in upper housing 74. According to this aspect of the invention, second end 88 of bar 78 includes at least one surface 94 that impinges cord 72 when bar 78 is pivotally-deflected in the direction of arrow 80 whereby the translation of handle assembly 70 along cord 72 is limited or prevented. As shown in FIG. 11, the height of bar 78 may vary along its length, for example, the height of bar 78 (specifically, the height of web section 84) may increase from first end 86 to second end 88. However, in one aspect of the invention, the height of bar 78 may be substantially uniform.

As described with respect to handle assembly 30 above, lower housing assembly 76 of handle assembly 70 may include at least one projection 96 having a surface 98 upon which cord 72 can be compressed when impinged by bar 78. Projection 96 may take any of the forms of projections 45 and 55 described above with respect to FIGS. 6, 7, and 8.

Figure 12:
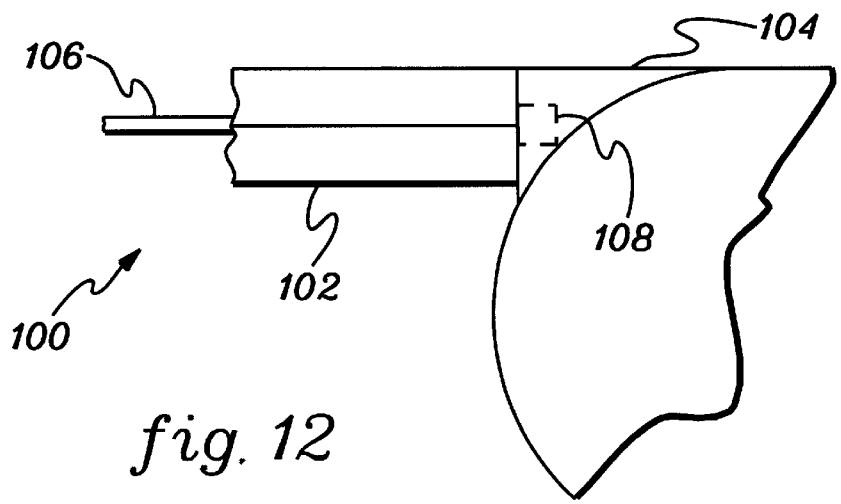
FIG. 12 is a partial side elevation view of another aspect of the invention.
Figure 13:
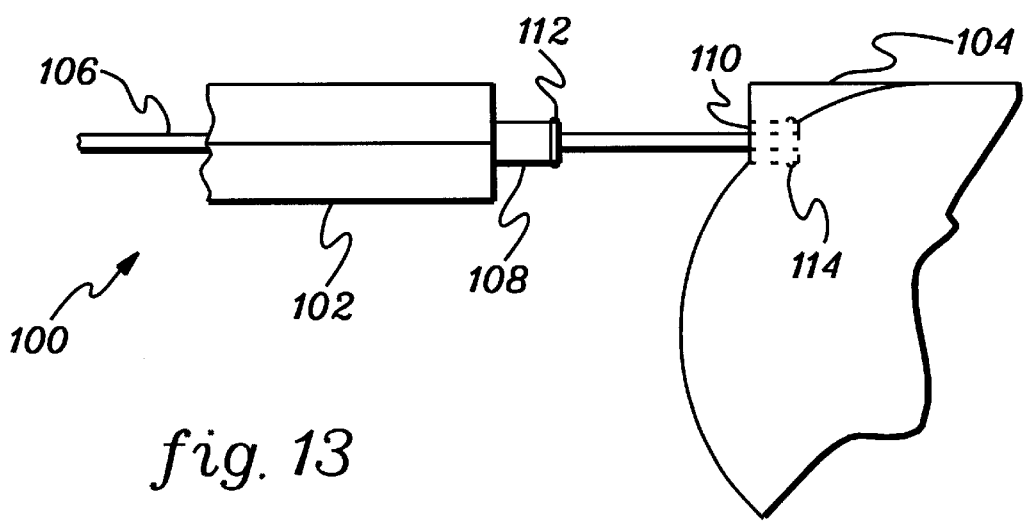
FIG. 13 is an exploded view of the aspect of the invention shown in FIG. 12.

FIGS. 12 and 13 illustrate partial side elevation views of another aspect of the present invention. FIG. 12 is a partial side elevation view of an assembly 100 comprising a handle assembly 102 and a retractable leash handle assembly 104 having a cord 106. Only a partial, representative view of retractable leash handle assembly 104 is shown in FIGS. 12 and 13. Handle assembly 102 may comprise one of the handle assemblies 20, 30, or 70 discussed above that can attached, for example, attached for translation, to cord 106. Retractable leash handle assembly 104 may be similar to one of the retractable leash handle assemblies referenced above, such as retractable leash handle assembly 14 in FIG. 1. For example, handle assembly 104 may be similar to the retractable leash assemblies disclosed in utility U.S. Pat. No. 2,324,504 and design U.S. Pat. No. 392,429. According to this aspect of the invention, handle assembly 102 detachably engages retractable leash handle assembly 104 whereby handle assembly 102 can be detached from retractable leash handle assembly 104 when assistance is needed to restrain an animal. According to this aspect of the invention, the retractable leash handle assembly 104, which typically includes a graspable handle, can be held in one hand and handle assembly 102 may be detached and held in another hand. FIG. 13 is an exploded view of assembly 100 shown in FIG. 12.

According to this aspect of the invention, handle assembly 102 may engage retractable leash handle assembly 104 by any conventional means, for example, by means of screw threads, interference fit, "snap fit", or equivalent methods. In the aspect of the invention shown in FIG. 13, handle assembly 102 includes a projection 108 that engages a recess 110 in retractable leash handle assembly 104. In another aspect of the invention, projection 108 may be included on retractable leash handle assembly 104 and recess 110 may be included on handle assembly 102. Though projection 108 and recess 110 may be threaded to provide a threaded engagement, in the aspect shown, projection 108 includes an annular projection 112 that engages an annular recess 114 in recess 110. In this aspect of the invention, a user can disengage handle assembly 102 by pulling assembly 102 out of recess 110. Handle assembly 102 my also re-engage retractable leash handle assembly 104 by inserting projection 108 into recess 110 whereby annular projection 112 engages annular recess 114.

Figure 14:
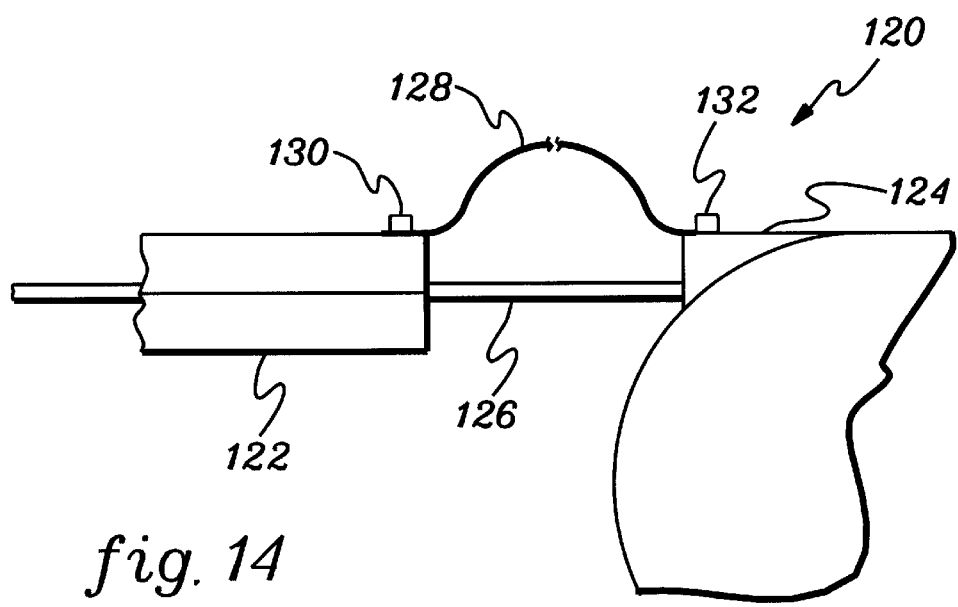
FIG. 14 is a partial side elevation view of another aspect of the invention.

FIG. 14 illustrates a still further aspect of the invention. FIG. 11 is a partial side elevation view of an assembly 120 comprising a handle assembly 122 and a retractable leash handle assembly 124. Again, only a partial, representative view of retractable leash handle assembly 124 is shown in FIG. 14. Elongated element 122 may comprise one of the handle assemblies 20, 30, 70, or 102 discussed above that can translate or slide, for example, freely slide, on a cord 126. Cord 126 may be similar to cord 12 shown in FIG. 1. Retractable leash handle assembly 124 may be similar to one of the retractable leash assemblies referenced above. In this aspect of the invention, handle assembly 122 is attached, for example, releasably attached, to retractable leash assembly 124 by means of a tensile element 128, for example, a cord, lanyard, or strap. Tensile element 128 may be similar to cord 12 discussed with respect to FIG. 1. Though any type of tensile element may be used for tensile element 128, the term "lanyard" will be used in the following discussion.

Lanyard 128 may of any size or length, but according to this aspect of the invention, lanyard 128 is attached at one end to handle assembly 122 and at the other to retractable leash handle assembly 124. Lanyard 128 may be attached to handle assembly 122 and retractable leash handle assembly 124 by conventional means, for example, by means of mechanical fasteners 130, 132, adhesives, or by integral molding to each assembly. Mechanical fasteners 130, 132 may comprise a loop and hook arrangement. For example, a hook or clasp may be mounted on one or both ends of lanyard 128 which engages a loop mounted on either handle assembly 22, retractable leash handle assembly 124, or both. In one aspect of the invention, one or both ends of lanyard 128 comprise a loop which engages a hook or clasp mounted on either handle assembly 122, 124 or both. According to this aspect of the invention, handle assembly 122 is allowed to translate or slide along cord 126 but is prevented from translating too far from retractable leash assembly 124 by lanyard 128. As a result, handle assembly 122 will be more easily accessible to the user of retractable leash handle assembly 124.

Lanyard 128 may be elastic or non-elastic, metallic or non-metallic. According to this aspect of the invention, lanyard 124 may be a nylon cord, a leather strap, an elastic cord, a rope, a string, twine, a wire or cable, for example, a coated wire or cable, or their equivalent.

According to this and earlier aspects of the invention, elongated elements 18, 20, 30, 70, 102, and 122 may assume any appropriate size or shape. In one aspect of the invention, elements 18, 20, 30, 70, 102, and 122 may comprise a length of between about 3 inches and about 3 feet, for example, between about 4 inches and about 12 inches. In one aspect, element 18 and its related elements are about 6 inches long. In one aspect of the invention, element 18 and its related elements may comprise a width of between about ½ inch and about 6 inches, for example, between about 1 inch and about 3 inches. In one aspect, element 18 and its related elements are about 1¼ inches wide. In one aspect of the invention, element 18 and its related elements may comprise a thickness or height of between about ¼ inch and about 3 inches, for example, between about ½ inch and about 1 inch. In one aspect, element 18 and its related elements are about ⅝ inches wide. In addition, apertures 36, 38 (see FIG. 5) may comprise any appropriate size or shape, for example, round or rectangular. However, in one aspect of the invention, apertures 36, 38 comprise round apertures having a diameter of between about 1/16 inch and about ½ inch, for example, between about ⅛ inch and about 1 inch in diameter. Elements 18, 20, 30, 70, 102, and 122 may also be shaped to be more amenable to being grasped by the user. For example, in one aspect of the invention, elements 18, 20, 30, 70, 102, and 122 may include ridges for finger placement or to facilitate grasping, for example, molded ridges or ridges otherwise formed.

Aspects of the present invention may be used for restraining any animal, domestic or wild, including, but not limited to, dogs, cats, horses, cows, sheep, cattle, oxen, pigs, oxen, rabbits, elephants, lions, tigers, bears, or any other animal that needs to be manually restrained. Aspects of the present invention provide improved methods and devices for assisting animal handlers, including pet owners, veterinarians, farmers, ranchers, and circus animal handlers, and the like, by providing additional means for grasping a leash when necessary. Aspects of the invention are particularly amenable for assisting users of retractable leashes. As will be appreciated by those skilled in the art, features, characteristics, and/or advantages of the handles and handle assemblies described herein, may be applied and/or extended to any embodiment (for example, applied and/or extended to any portion thereof).

Although several aspects of the present invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A restraint-assisting handle for a retractable leash, the retractable leash having an elongated cord and having a housing for storing the elongated cord, the restraint-assisting handle comprising:

an elongated element having a first end having a first aperture, a second end having a second aperture; and means for slidably engaging the elongated cord in the first aperture and the second aperture as the elongated cord extends from and retracts into the housing of the retractable leash.

2. The restraint-assisting handle as recited in claim 1, wherein the elongated cord comprises one of a lead and a strap.

3. The restraint-assisting handle as recited in claim 1, wherein the elongated element further comprises an elongated channel extending from the first end to the second end.

4. The restraint-assisting handle as recited in claim 3, wherein the elongated channel comprises an elongated internal channel.

5. The restraint-assisting handle as recited in claim 4, wherein the means for engaging the elongated cord comprises the elongated channel.

6. The restraint-assisting handle as recited in claim 1, wherein the elongated element further comprises means for attaching the elongated element to the housing of the retractable leash.

7. The restraint-assisting handle as recited in claim 1, wherein the means for slidably engaging the elongated cord allows the handle to freely slide on the elongated cord.

8. The restraint-assisting handle as recited in claim 6, wherein the means for attaching the elongated element comprises one of a strap, a cord, and a lanyard.

9. An animal restraint assembly comprising:
   a retractable leash having an elongated cord and a housing for storing the elongated cord; and
   an elongated element having first and second apertures; and
   means for slidably engaging the elongated cord, in said first and second apertures as the elongated cord extends from and retracts into the housing of the retractable leash.

10. The animal restraint assembly as recited in claim 9, wherein the elongated cord comprises one of a lead and a strap.

11. The animal restraint assembly as recited in claim 9, wherein the elongated element further comprises an elongated channel extending from the first end to the second end.

12. The animal restraint assembly as recited in claim 11, wherein the means for engaging the elongated cord comprises the elongated channel.

13. The animal restraint assembly as recited in claim 9, wherein the elongated element further comprises means for attaching the elongated element to the housing of the retractable leash.

14. The animal restraint assembly as recited in claim 10, wherein the means for slidably engaging the elongated cord comprises means wherein the elongated element freely slides on the elongated cord.

15. The animal restraint assembly as recited in claim 10, wherein the elongated element comprises a handle assembly.

16. A method of restraining an animal, the method comprising:
   providing a retractable leash having an elongated cord, a housing for storing the elongated cord, and a handle; the elongated cord having a first end comprising a means for attaching the elongated cord to the animal and a second end attached to the retractable leash;
   mounting an elongated element to the elongated cord;
   attaching the first end of the elongated cord to the animal; and
   restraining the animal by grasping the handle of the retractable leash in one hand and the elongated element in the other hand.

17. The method as recited in claim 16, wherein mounting an elongated element to the elongated cord comprises slidably mounting the elongated element to the elongated cord.

18. The method as recited in claim 17, wherein slidably mounting the elongated element to the elongated cord comprises mounting the elongated element to the elongated cord wherein the elongated element freely slides on the elongated cord as the elongated cord extends from and retracts into the housing of the retractable leash.

* * * * *